US011331725B2

(12) United States Patent
Chen et al.

(10) Patent No.: US 11,331,725 B2
(45) Date of Patent: May 17, 2022

(54) SYNTHETIC METHOD FOR PREPARING SMALL PALLADIUM NANOCUBES

(71) Applicant: HONDA MOTOR CO., LTD., Tokyo (JP)

(72) Inventors: Shutang Chen, San Jose, CA (US); Gugang Chen, Palo Alto, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 251 days.

(21) Appl. No.: 16/517,251

(22) Filed: Jul. 19, 2019

(65) Prior Publication Data

US 2021/0016355 A1  Jan. 21, 2021

(51) Int. Cl.
*B22F 9/24* (2006.01)
*B22F 1/07* (2022.01)
*B82Y 40/00* (2011.01)

(52) U.S. Cl.
CPC ............... *B22F 9/24* (2013.01); *B22F 1/07* (2022.01); *B82Y 40/00* (2013.01)

(58) Field of Classification Search
None
See application file for complete search history.

(56) References Cited

U.S. PATENT DOCUMENTS

| 2005/0056118 | A1* | 3/2005 | Xia | B22F 1/0007 75/330 |
| 2008/0226934 | A1* | 9/2008 | Alivisatos | B82Y 30/00 428/570 |
| 2009/0282948 | A1 | 11/2009 | Xia et al. | |
| 2011/0118111 | A1* | 5/2011 | Hwang | H01M 4/921 502/185 |
| 2011/0124500 | A1* | 5/2011 | Fang | B82Y 30/00 502/331 |
| 2014/0179941 | A1 | 6/2014 | Bao | |
| 2014/0255247 | A1* | 9/2014 | Kralik | C22B 3/44 420/466 |
| 2014/0296564 | A1 | 10/2014 | Ohsawa et al. | |

(Continued)

FOREIGN PATENT DOCUMENTS

KR  10-2015-0105165 A  9/2015

OTHER PUBLICATIONS

Yang, H-J. et al., "Monodisperse Copper Nanocubes: Synthesis, Self-Assembly, and Large-Area Dense-Packed Films", Chemistry of Materials, vol. 26, pp. 1785-1793, published Feb. 11, 2014.*

(Continued)

*Primary Examiner* — George Wyszomierski
(74) *Attorney, Agent, or Firm* — ArentFox Schiff LLP; Mark Duell

(57) ABSTRACT

The present disclosure relates to a method for synthesizing Pd nanocubes having an average size less than 10 nm. The reaction temperature, reaction time, and molar ratios of TOP/Pd-OLA can be used to control size and formation of the Pd nanocubes. The present disclosure is also directed to Pd nanocubes, less than 10 nm, having face centered cubic structures. Pd nanocubes of the present disclosure are an effective catalyst for $CO_2$ reduction reaction with excellent selectivity for CO. Small sized Pd nanocubes can be used not only as the seeds to prepare other metal nanocubes, but can also as powerful catalysts for a wide variety of reactions in different industrial processes.

17 Claims, 4 Drawing Sheets

(56) References Cited

U.S. PATENT DOCUMENTS

2018/0044805 A1    2/2018  Serov et al.
2021/0031271 A1*  2/2021  Chen .................... B22F 1/0018

OTHER PUBLICATIONS

International Search Report and Written Opinion, issued by International Searching Authority in corresponding International Application No. PCT/US2020/039525, dated Oct. 16, 2020.

Younan Xia et al., "Shape-Controlled Synthesis of Metal Nanocrystals: Simple Chemistry Meets Complex Physics?", NIH Public Access, Angew Chem Int Ed Engl. vol. 48, No. 1, (91 Pages Total), (2009), DOI: 10.1002/anie.200802248.

Ermete Antolini., "Palladium in fuel ceil catalysis", The Royal Society of Chemistry 2009, Energy & Environmental Science, (2009), vol. 2, (pp. 915-931).

Hsin-Chieh Peng et al., "Quantitative Analysis of the Coverage Density of Br– ions on Pd{100} Facets and Its Role in Controlling the Shape of Pd Nanocrystals", Journal of the American Chemical Society, vol. 135, pp. 3780-3783, (2013).

Hui Zhang et al., "Shape-Controlled Synthesis of Pd Nanocrystals and Their Catalytic Applications", Accounts of Chemical Research, vol. 46, No. 8, (2013), pp. 1783-1794.

Jianzhou Wu et al., "Influence of Reduction Kinetics on the Preparation of Well-Defined Cubic Palladium Nanocrystals", American Chemical Society, Inorganic Chemistry 2018 vol. 57, pp. 8128-8136, (2018).

Junjie Li et al., "Size-dependent catalytic activity over carbon-supported palladium: nanoparticles in dehydrogenation of formic acid", Journal of Catalysis, vol. 352, (2017), Published by Elsevier Inc., pp. 371-381.

Kyle D. Gilroy et al., "Shape-Controlled Synthesis of Colloidal Metal Nanocrystals by Replicating the Surface Atomic Structure on the Seed", Advanced Materials, vol. 30, (2018), 1706312, pp. 1 to 25.

Madeline Vara et al., "A Photochemical, Room-Temperature, and Aqueous Route to the Synthesis of Pd Nanocubes Enriched with Atomic Steps and Terraces on the Side Faces" American Chemical Society, Chemistry of Materials, (2017), vol. 29, pp. 4563-4571.

Mohit Chawla et al., "High catalytic activities of palladium nanowires synthesized using liquid crystal templating approach", Journal of Molecular Catalysis A: Chemical, vol. 423, (2016), pp. 126-134.

Tao Chen et al., "Size-dependent catalytic kinetics and dynamics of Pd nanocubes: a single-particle study", Phys. Chem. Chem. Phys., (2016), vol. 18, pp. 22494-22502.

Wenlei Zhu et al., "Shape-Controlled CO2 Electrochemical Reduction on Nanosized Pd Hydride Cubes and Octahedra", Advanced Energy Materials, 2019, vol. 9, 1802840, pp. 1 to 6.

Wenxin Niu et al., "Seed-Mediated Growth of Nearly Monodisperse Palladium Nanocubes with Controllable Sizes", American Chemical Society, Crystal Growth & Design, vol. 8, No. 12, pp. 4440-4444, (2008).

Xiaoqing Huang et al., "Freestanding palladium nanosheets with plasmonic and catalytic properties", Nature Nanotechnology, vol. 6, Jan. 2011, pp. 28-32, 6 pages total.

* cited by examiner

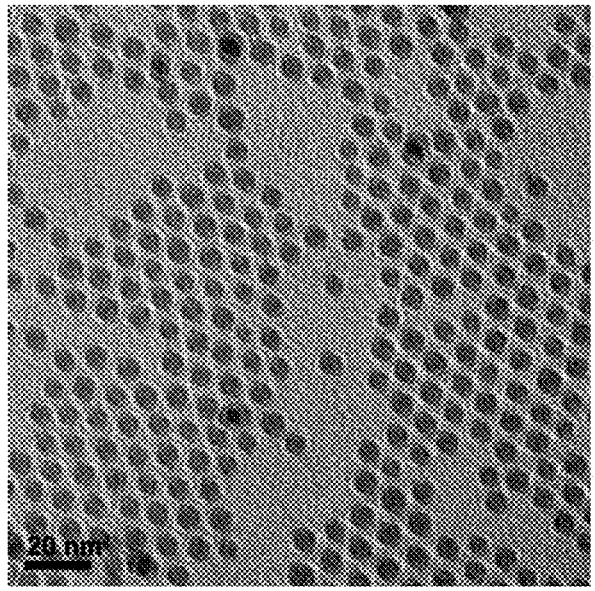
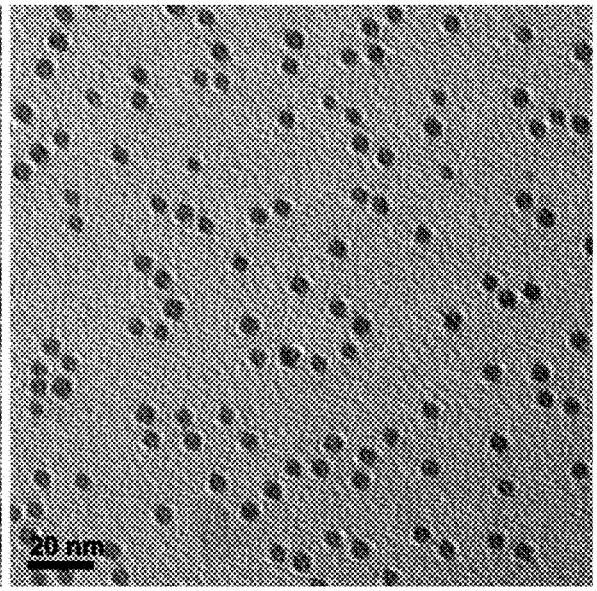
FIG. 3A                    FIG. 3B
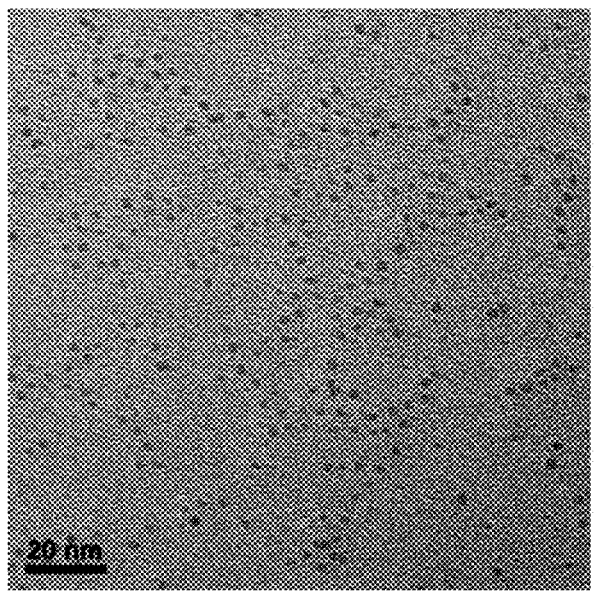
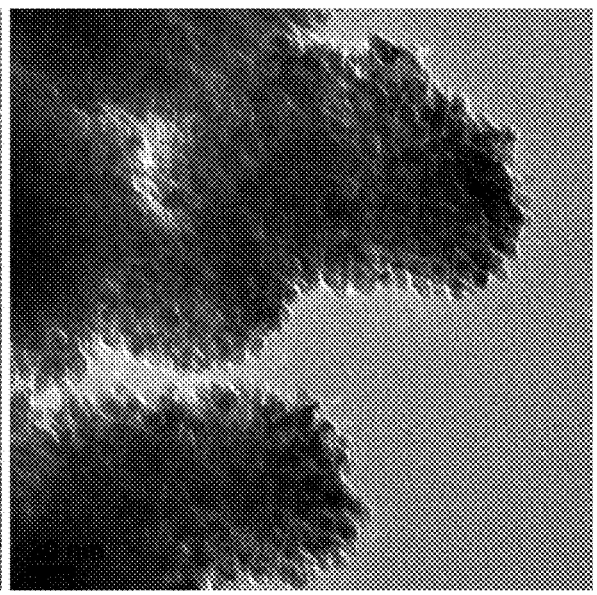
FIG. 3C                    FIG. 3D

SYNTHETIC METHOD FOR PREPARING SMALL PALLADIUM NANOCUBES

TECHNICAL FIELD

The present disclosure is directed to a method for preparation of metal nanostructures and metal nanocatalysts, such as palladium nanocubes.

BACKGROUND

Metal nanostructured materials have received considerable interest in industrial processes, catalytic processes, synthetic chemistry, and commercial devices. For example, palladium (Pd) nanostructures are important catalysts in carbon-carbon coupling reactions, $CO_2$ reduction, and hydrogenation reactions due to the large diversity of species, a rich combination of different oxidation states and ligand coordination modes. Carbon dioxide reduction has gained considerable attention as a renewable resource and as a way to produce various chemical products using different catalysts. Using metal nanostructures as a catalyst for carbon dioxide reduction can affect the thermodynamics and kinetics of the $CO_2$ reduction reaction, while the surface features or facets of the metal nanostructures can affect various aspects of the catalytic process, including which products are favored. The structure of various metal nanostructures and nanocubes can vary depending upon the methods and conditions used for production. Accordingly, synthetic methods for producing metal nanostructures, such as polyhedrons and nanocubes, have garnered attention because of the potential ability to tailor subsequent catalytic reactions using pre-designed features of the nanostructures, such as surface facets, surface area, and nanostructure size. Predictable, tunable, and scalable synthetic methods are needed to produce metal nanostructures, specifically at the smaller nanometer scale. Thus, there is a need to synthesize metal cubic or polyhedral nanocatalysts for a rich variety of organic reactions.

SUMMARY

The following presents a simplified summary of one or more aspects of the present disclosure in order to provide a basic understanding of such aspects. This summary is not an extensive overview of all contemplated aspects and is intended to neither identify key or critical elements of all aspects nor delineate the scope of any or all aspects. Its purpose is to present some concepts of one or more aspects in a simplified form as a prelude to the more detailed description that is presented later.

The present disclosure is directed to a method for synthesizing metal nanostructures with certain index facets and certain sizes, the method using one or more trialkylphosphines as a shape control ligand in the reaction mixture. In some embodiments, the metal nanostructures can comprise palladium nanostructures and the shape control ligand can comprise trioctylphosphine (TOP). Palladium nanostructures with controlled facets demonstrate superior catalytic performance for oxygen reduction reactions, carbon dioxide reduction reactions, and various other chemical reactions. Theoretical studies find that surface facets and terraces are more catalytically active and selective for C—O than flat palladium. Palladium nanocubes with six facets are regarded as one of the most active catalysts for carbon dioxide reduction. The presently disclosed method can surprisingly control the size of palladium nanocubes below 10 nm, for example, by controlling the molar ratio of TOP to palladium, by controlling the reaction time, by controlling the reaction temperature, or combinations of the reaction conditions thereof.

Moreover, the palladium nanocubes produced by the method disclosed herein demonstrate superior activity and selectivity for carbon dioxide reduction reactions. This disclosure is also directed to metal nanocubes and nanostructures provided by the method described herein and devices comprising the metal nanocubes and nanostructures provided by the method described herein, as well as methods of using the same. This disclosure is not limited to palladium metal as the methods described herein can be applied to other metals, for example, gold, silver, and platinum. These and other aspects of the invention will become more fully understood upon a review of the detailed description, which follows.

BRIEF DESCRIPTION OF THE DRAWINGS

FIGS. 3A-3D show TEM images of Pd nanocubes synthesized at different molar ratios of TOP/Pd-OLA for a reaction time of 20 min, TOP/Pd-OLA molar ratio of 15:1 (FIG. 3A), TOP/Pd-OLA molar ratio of 5:1 (FIG. 3B), TOP/Pd-OLA molar ratio of 2:1 (FIG. 3C), and no TOP, a molar ratio of zero (FIG. 3D) according to some aspects of the present disclosure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Various aspects of this disclosure relates to a method of synthesizing metal nanocubes, where the edges of the nanocubes have an average length of about or less than 10 nanometers. The method described in the current disclosure can significantly and precisely control the average particle size and optionally produces Pd nanocubes having an average edge length about or less than 7 nm.

Figure 1:
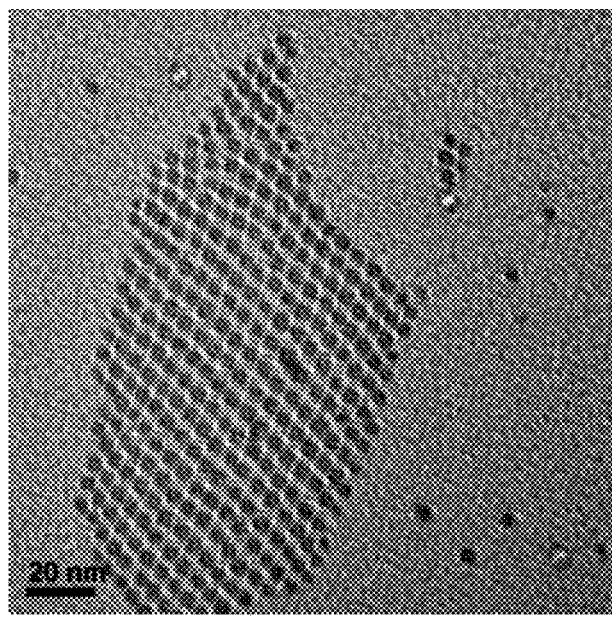
FIG. 1 shows a TEM image of 3.1 nm Pd nanocubes synthesized at a molar ratio of 10:1 of TOP/Pd-OLA for a reaction time of 20 min according to some aspects of the present disclosure.

According to some aspects, the present disclosure is directed to a method for preparing metal nanocubes and metal nanostructures. In some embodiments, the method can comprise preparation of a metal complex solution. According to some aspects, the metal complex solution is combined with a hot reaction mixture under an inert atmosphere, for example, by hot-injection. The hot reaction mixture contains a shape control ligand. The metal nanostructures subsequently form in the hot reaction mixture. If the metal complex solution comprises palladium and the hot reaction mixture comprises trioctylphosphine (TOP) as a shape control ligand, the palladium nanostructures will comprise uniform palladium nanocubes (FIG. 1). The method is according to some aspects, wherein preparing a reaction mixture further comprises preparing a reaction mixture comprising a second complexing agent, for example, oleylamine (OLA), and a shape control ligand by heating the reaction mixture under inert atmosphere.

The palladium complex solution may comprise one or more palladium complexes. As used herein, the term "palladium complex" refers to a complex of palladium and one or more complexing agents. Complexing agents useful according to the present disclosure include, but are not limited to, tetradecylamine (TDA), dodecylamine (DDA), hexadecylamine (HDA), octadecylamine (ODA), and oleylamine (OLA). According to some aspects, the palladium complex may be provided by combining one or more palladium atoms or palladium salts with one or more complexing agents in a solution under an inert atmosphere and stirring or sonicating for an acceptable length of time at an acceptable temperature. For example, the palladium complex may be provided by combining a palladium salt and one or more complexing agents in a solution under an inert gas flow. Non-limiting examples of other metals that can be substituted for palladium in the methods herein are gold, silver, and platinum. Examples of inert gases include, but are not limited to, nitrogen gas, argon gas, helium gas, radon gas, neon gas, xenon gas, and combinations thereof. The combined solution may then be mixed or sonicated at ambient temperature for about one minute to about one hour, or optionally about 20 minutes to 40 minutes, to provide a palladium complex solution comprising the palladium complex.

According to some aspects, the palladium nanostructures may be provided by heating the palladium complex solution with a shape control ligand. For example, the palladium nanostructures may be provided by combining the palladium complex solution with one or more shape control ligands at a combining temperature under an inert atmosphere for an acceptable length of time. For example, the palladium nanostructures may be provided by combining the palladium complex solution with a shape control ligand under an inert atmosphere at an elevated temperature of between about 100 and 500° C., optionally between about 150 and 350° C., optionally between about 175 and 250° C., and optionally about 200° C. The combined solution may be held at the combining temperature for a combining time of between about 1 minute and 2 hours, optionally between about 1 minute and 1 hour, optionally between about 1 minute and 30 minutes, or optionally between about 1 minute and 20 minutes; then, the temperature may optionally be increased to a reaction temperature. The reaction temperature may be between about 100 and 500° C., optionally between about 150 and 350° C., optionally between about 175 and 300° C., and optionally about 250° C. The combined solution may be held at the reaction temperature for a reaction time of between about 1 minute and 2 hours, optionally between about 1 minute and 1 hour, optionally between about 1 minute and 30 minutes, or optionally between about 1 minute and 20 minutes, to provide a palladium nanostructure solution containing the palladium nanostructures. Examples of shape control ligands include, but are not limited to, tributylphosphine, tributylphosphine oxide, trioctylphosphine, trioctylphosphine oxide, oleylamine, tetradecylamine, dodecylamine, octadecylamine, hexadecylamine, oleic acid, and combinations thereof.

According to some aspects, the palladium complex solution comprises palladium and oleylamine (OLA). Further according to some aspects, the shape control ligand is trioctylphosphine (TOP). In some embodiments, the molar ratio of TOP/Pd after combining the palladium complex and TOP in the reaction mixture is between about 50:1 and 1:10, optionally between about 50:1 and 1:1, optionally between about 20:1 and 1:2, optionally between about 20:1 and 1:1, and optionally between about 10:1 and 1:1. In an embodiment, no TOP is in the reaction mixture, the molar ratio of TOP/Pd is zero, and aggregated palladium nanoparticles are formed (FIG. 3D).

Figure 2:
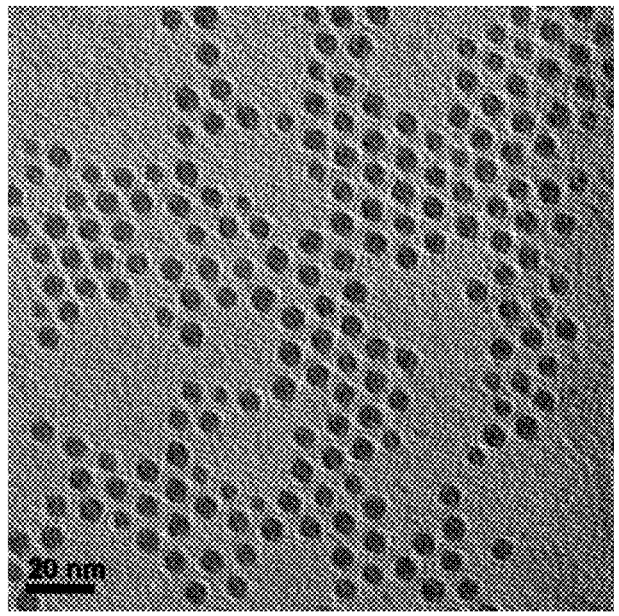
FIG. 2 shows a TEM image of 5.8 nm Pd nanocubes synthesized at a molar ratio of 10:1 of TOP/Pd-OLA for a reaction time of 60 min according to some aspects of the present disclosure.

In some embodiments, the combining temperature is 200° C., the combining time is 20 minutes, the molar ratio of TOP/Pd is 10:1, the reaction temperature is 250° C., the reaction time is 20 minutes, and Pd nanocubes of average size 3.1 nm are formed (FIG. 1). In some embodiments, the combining temperature is 200° C., the combining time is 20 minutes, the molar ratio of TOP/Pd is 10:1, the reaction temperature is 250° C., the reaction time is 60 minutes, and Pd nanocubes of average size 5.8 nm are formed (FIG. 2).

In some embodiments, the combining temperature is 200° C., the combining time is 20 minutes, the molar ratio of TOP/Pd is 15:1, the reaction temperature is 250° C., the reaction time is 20 minutes, and Pd nanocubes of average size 5.7 nm are formed (FIG. 3A). In some embodiments, the combining temperature is 200° C., the combining time is 20 minutes, the molar ratio of TOP/Pd is 5:1, the reaction temperature is 250° C., the reaction time is 20 minutes, and Pd nanocubes of average size 4.3 nm are formed (FIG. 3B). In some embodiments, the combining the combining temperature is 200° C., the combining time is 20 minutes, the molar ratio of TOP/Pd is 5:1, the reaction temperature is 250° C., the reaction time is 20 minutes, and Pd nanostructures of average size 1.9 nm are formed (FIG. 3C). According to some aspects, no TOP is in the reaction mixture, the combining temperature is 200° C., the combining time is 20 minutes, the molar ratio of TOP/Pd is zero, the reaction temperature is 250° C., the reaction time is 20 minutes, and aggregated Pd nanoparticles are formed (FIG. 3D).

According to some aspects, a palladium complex solution can be prepared by combining a palladium salt, for example, palladium acetylacetonate, with OLA, at a Pd concentration of 0.1 millimolar, and sonicating for about 30 minutes. The Pd concentration can be fraom about 0.05 millimolar to about 2 millimolar, optionally about 0.05 millimolar to about 1 millimolar, optionally about 0.05 millimolar to about 0.5 millimolar, and optionally about 0.1 millimolar. Examples of palladium sources include, but are not limited to, palladium acetylacetonate, palladium acetate, palladium nitrate, palladium hexafluoroacetylacetonate, and palladium trifluoroacetate.

According to some aspects, the metal nanostructures are isolated by injecting or adding ethanol, or another hydrophilic solvent such as methanol or acetone, to the reaction mixture, centrifuging, and discarding the supernatant, retaining the nanostructures in the sediment. The nanostructures can be washed one or more times, for example, by adding a mixture of hexane and ethanol to the sediment, centrifuging, and discarding the supernatant. The metal nanostructures can be stored in hydrophobic solvents (e.g. hexane, toluent, and chloroform) before use or characterization, depending on the application.

According to some aspects, a method for preparing metal nanocubes is disclosed herein, the method comprising: providing a metal complex solution comprising a metal and a first complexing agent; preparing a reaction mixture comprising a shape control ligand by heating the reaction mixture under inert atmosphere to a combining temperature; combining the metal complex solution and the reaction mixture at the combining temperature under inert atmosphere; holding the reaction mixture at the combining temperature for a combining time under inert atmosphere; heating the reaction mixture to a reaction temperature under inert atmosphere; and holding the reaction mixture for a reaction time at the reaction temperature under inert atmosphere to form metal nanocubes. The method may further comprise cooling the reaction mixture containing the metal nanocubes and isolating the metal nanocubes from the reaction mixture. The metal utilized can comprise, by way of non-limiting example, palladium, gold, silver, and platinum. The shape control ligand can comprise one or more trialkylphosphines, for example, tributylphosphine, tributylphosphine oxide, trioctylphosphine, trioctylphosphine oxide, oleylamine, tetradecylamine, dodecylamine, octadecylamine, hexadecylamine, oleic acid, and combinations thereof.

In some embodiments, the metal complex solution is provided by mixing the metal, suitable salt form of the metal, or other suitable form, with an alkylamine to form the metal complex solution, wherein the alkylamine is chosen from oleylamine, tetradecylamine, hexadecylamine, octadecylamine, and combinations thereof. According to some aspects, the combining temperature is 185° C. to 220° C. and the reaction temperature is 240° C. to 260° C. In some embodiments, the combining time is 15 to 25 minutes and the reaction time is 15 to 25 minutes.

For example, the metal complex solution can be provided by mixing a metal salt comprising palladium acetylacetonate with oleylamine until a solution comprising palladium is formed, or other metals, metal salts, or metal forms can be utilized to form a metal complex solution. According to some aspects, palladium metal is utilized, the shape control ligand is trioctylphosphine, and the molar ratio of trioctylphosphine to palladium in the reaction mixture is from 15:1 to 1:1. In some embodiments, the combining temperature is 200° C., the combining time is 20 minutes, the reaction temperature is 250° C., the reaction time is 20 minutes, the molar ratio of trioctylphosphine to palladium in the reaction mixture is 10:1, and the metal nanocubes comprise palladium nanocubes comprising an average size of 3.1 nm.

In some embodiments, the combining temperature is 200° C., the combining time is 20 minutes, the reaction temperature is 250° C., the reaction time is 60 minutes, the molar ratio of trioctylphosphine to palladium in the reaction mixture is 10:1, and the metal nanocubes comprise palladium nanocubes comprising an average size of 5.8 nm. In some embodiments, the combining temperature is 200° C., the combining time is 20 minutes, the reaction temperature is 250° C., the reaction time is 20 minutes, the molar ratio of trioctylphosphine to palladium in the reaction mixture is 15:1, and the metal nanocubes comprise palladium nanocubes comprising an average size of 5.7 nm. In some embodiments, the combining temperature is 200° C., the combining time is 20 minutes, the reaction temperature is 250° C., the reaction time is 20 minutes, the molar ratio of trioctylphosphine to palladium in the reaction mixture is 5:1, and the metal nanocubes comprise palladium nanocubes comprising an average size of 4.3 nm.

The methods disclosed herein may further comprise washing the metal nanocubes with a second organic solvent or by any means known in the art. Isolation of the metal nanocubes can be, for example, by centrifugation or by other means. In some embodiments, a plurality of palladium nanocubes comprising an average size from 1.9 nm to 5.8 nm, a plurality of palladium nanocubes comprising an average size of 3.1 nanometers, a plurality of palladium nanocubes comprising an average size of 5.8 nanometers, and a plurality of palladium nanocubes comprising an average size of 4.3 nanometers is disclosed herein. According to some aspects, a catalyst for CO2 reduction comprising the palladium nanocubes of average size 3.1 nanometers is provided herein, a method for CO2 reduction comprising the catalysts disclosed herein, and the palladium nanocubes of average size less than 10 nanometers are disclosed herein, wherein the palladium nanocubes have a reaction selectivity for carbon monoxide with a FE of 56% at −1.0 V vs. RHE.

Acording to some aspects, the method may comprise a one-step synthetic strategy. As used herein, the term "one-step synthetic strategy" refers to a synthetic strategy wherein at least a first reactant is converted to a reaction product in a single synthesis step. For example, as described herein, the palladium complex solution may be converted to palladium nanocubes in a single synthesis step, in particular, provided the shape control ligand and reaction conditions herein.

Figure 4A:
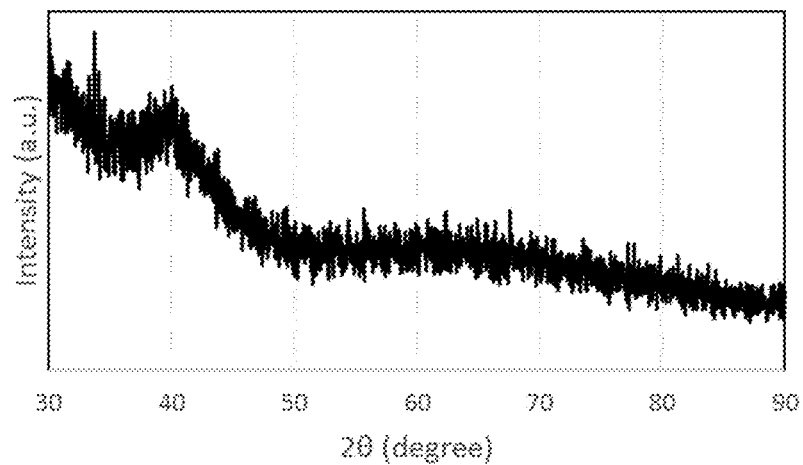
FIG. 4A shows an XRD pattern of irregular Pd nanoparticles with the average size of 1.9 nm.
Figure 4B:
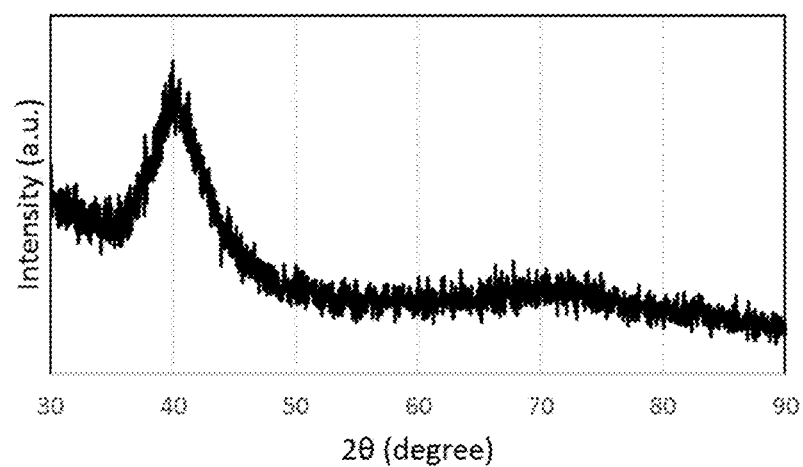
FIG. 4B shows an XRD pattern of Pd nanocubes with average size of 3.1 nm according to some aspects of the present disclosure.
Figure 4C:
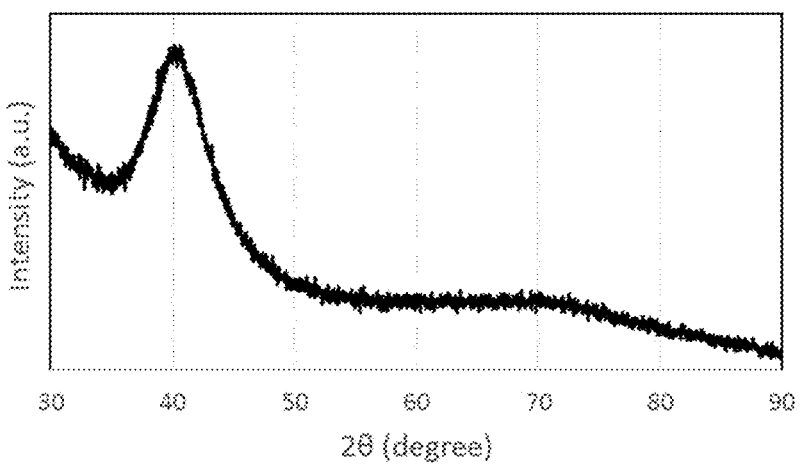
FIG. 4C shows an XRD pattern of Pd nanocubes with average size of 5.7 nm according to some aspects of the present disclosure.
Figure 5:
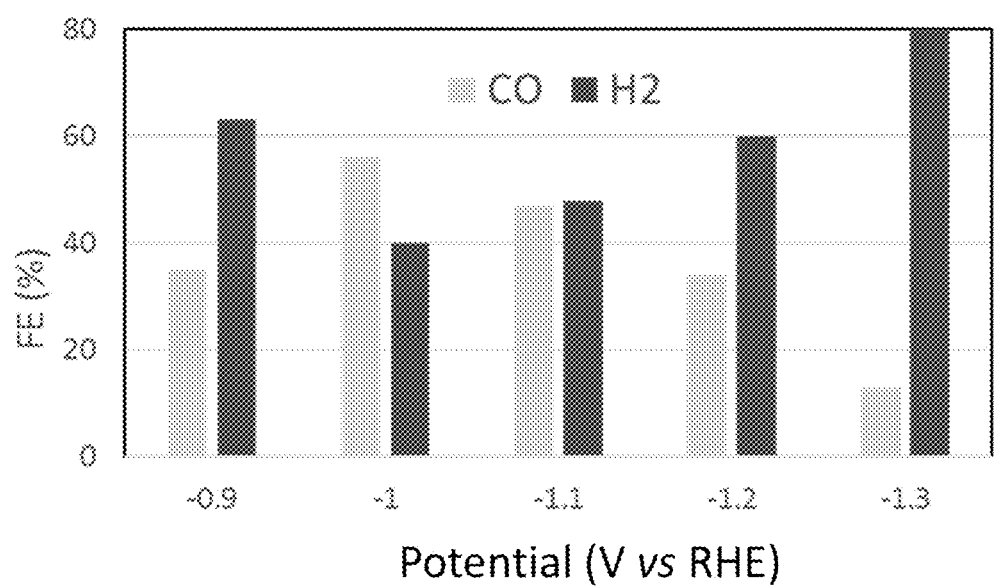
FIG. 5 shows electrocatalytic activity of 3.1 nm Pd nanocubes for electrochemical reduction of $CO_2$ at different potential vs RHE according to some aspects of the present disclosure.

Various aspects of this disclosure relates to Pd nanocubes synthesized using the present method. Small Pd nanocubes had been obtained in hydrophobic phase by hot-injection method at 250° C. TEM results indicated that the reaction temperature and molar ratios of TOP/Pd-OLA played critical roles during the formation of Pd nanocubes. The average size of Pd nanocubes may be controlled from about 2 nm to about 7 nm using the present synthesis method. XRD results showed that Pd nanocubes have face centered cubic structures (FIGS. 4A-4C). Pd nanocubes produced according to the methods disclosed herein acting as catalysts for $CO_2$ reduction reaction showed excellent selectivity for CO, which can reach the maximum FE of 56% at −1.0 V (FIG. 5). The small sized Pd nanocubes may not only be used as the seeds to prepare other metal nanocubes, but can also act as powerful catalysts for a wide variety of reactions in different industrial processes.

Trioctylphosphine molar concentration ratio compared to the metal molar concentration ratio, reaction time, and the reaction temperature were demonstrated to play a very important role for the formation of Pd nanocubes.

In one aspect of the present disclosure, the reaction conditions are in organic solutions or oil phase, and Pd nanocubes obtained through oil phase synthesis are monodispersed and chemically and physically stable in solution.

In one aspect of the present disclosure, Pd nanocubes having an average edge length of 3.1 nm were applied as a catalyst in $CO_2$ reduction reaction and showed excellent selectivity for CO, which can reach a maximum FE of 56% at −1.0 V (FIG. 5). Thus, for example, the present disclosure comprises catalytic properties of the metal nanostructures disclosed herein, and devices and systems comprising the metal nanostructures enabled herein.

As used herein, the size of a nanocube is defined as the length along one edge of the cube. If a nanocube has substantial deviations from a cube shape, the average length of the edges of the cube can be utilized to define the size, or, for example, one or more aspect ratios can be used in combination with the length of one edge. As used herein, the term "nanostructure" refers to a structure having at least one dimension on the nanoscale, that is, at least one dimension between about 0.1 and 1000 nm. It should be understood that "nanostructures" include, but are not limited to, nanosheets, nanocubes, nanoparticles (e.g., polyhedral nanoparticles), nanospheres, nanowires, nanofibers, and combinations thereof. A nanocube may comprise a cube having a size on the nanoscale. A nanowire may comprise a wire having a diameter on the nanoscale. A nanoparticle may comprise a particle wherein each spatial dimension thereof is on the nanoscale.

As used herein, the term "catalyst" refers to a component that directs, provokes, or speeds up a chemical reaction, for example, the reduction of carbon dioxide. Examples of catalysts useful according to the present disclosure include, but are not limited to, metal nanocubes, synthetic ligands, shape control ligands, and palladium nano structures.

As used herein, the terms "uniform", "uniform size", and "uniform shape" are defined as remaining the same in all cases and at all times; unchanging in form or character; provided the same reactants and same reaction conditions, with minimal or defined variation. It should be noted that the methods described herein can provide nanocubes having a uniform cube shape, with the aspect ratio of a cube defined as the ratio of the length to the width or the ratio of the length to the height, a cube having an aspect ratio of 1, with deviations from cubic shape demonstrated by an aspect ratio, either length/width or length/height, other than 1. Under the same reaction conditions, the aspect ratio of the nanocubes provided by the methods herein can be about 1+/−90%, 1+/−80%, 1+/−70%, 1+/−60%, 1+/−50%, 1+/−40%, 1+/−30%, 1+/−20%, 1+/−10%, 1+/−5%, 1+/−2.5, or 1+/−1%.

The present disclosure is also directed to palladium nanostructures provided by the methods described herein and systems or devices comprising the palladium nanostructures provided by the methods described herein, as well as methods of using the same. For example, the device may comprise metal nanocubes in a catalyst, the device may comprise an electrode (such as an electrode for a battery) in a vessel, among other embodiments.

Various aspects of the present disclosure are further described by the following example(s). The word "example" is used herein to mean "serving as an example, instance, or illustration." Any aspect described herein as "example" is not necessarily to be construed as limiting, preferred, or advantageous over other aspects.

EXAMPLE 1

Synthesis of Pd-OLA Precursor Stock Solution

Chemicals. Palladium acetylacetonate (99.0%), trioctylphosphine (TOP, 90%), oleylamine (OLA, 70%), hexadecylamine (HDA or HAD, 98%), octadecylamine (ODA, 98%), toluene (99.9%), acetone (99%), and chloroform (99.9%), 1-octadecene (ODE, 98%) were purchased from Sigma-Aldrich. Tetradecylamine (TDA, >96%) was purchased from Tokyo Chemical Industry Co., Ltd. (TCI). Hexane (99%), methanol (99%), and ethanol (200 proof) were purchase from Fisher Chemicals. All chemicals were used as received unless described otherwise.

Procedure: 60 mg of palladium acetylacetonate (0.2 mmol), and 2 mL of OLA were added into the flask under Ar or $N_2$ flow. Following Ar or $N_2$ blowing for 20 minutes, the mixed solution was sonicated for 30 min. After sonication, the mixed solution turned clear. The amounts of palladium acetylacetonate may vary from 30 mg to 600 mg, and the amounts of OLA and TOP may increase proportionally. The stock solution could also be prepared by replacing OLA with TDA, HDA or ODA.

EXAMPLE 2

Synthesis of Pd Nanocubes 6.0 mL of OLA (70%) was loaded in a 25 mL three-neck flask where oxygen was removed through Ar blowing for 20 min. Subsequently, 1.0 mL (2 millimoles) of TOP (at 90% purity) was injected into the flask under Ar flow. After 20 min of Ar blowing, the flask was rapidly heated to 200° C. Next, 2 mL of Pd-OLA stock solution (0.2 millimoles Pd) prepared in Example 1 was quickly injected into a hot flask and the reaction solution turned yellow immediately. The molar ratio of TOP/Pd in the reaction solution was was 10:1. The reaction was held at 200° C. for 20 min. Subsequently, the reaction temperature was increased to 250° C. After keeping the reaction solution at 250° C. for another 20 min, the reaction solution was cooled to room temperature. After the temperature of the reaction solution reached room temperature, 5 mL of ethanol or other hydrophilic solvents, such as methanol or acetone, was injected into the reaction mixture. The products were separated by centrifuging at 8000 rpm for 5 min. The supernatant was discarded. A total of 10 mL of hexane and ethanol (v/v, 1:9) was then added to the sediment. Subsequently, the mixture was centrifuged at 8000 rpm for 5 min to wash the products. The washing procedure was repeated twice to remove unreacted precursors and surfactant. The Pd nanocubes were stored in hydrophobic solvents, such as hexane, toluene, chloroform, or mixtures thereof, before characterization.

EXAMPLE 3

Edge Length of Pd Nanocubes

As shown FIGS. 1-3D, the average edge lengths of Pd nanocubes were determined by TEM. In one experiment using the present method, uniform Pd nanocubes with smaller size were synthesized at 250° C. with a reaction time of 20 minutes and with a 10:1 molar ratio of TOP to Pd-OLA. The experimental results are shown in FIG. 1. The smaller sized Pd nanocubes was self-assembled and the average edge length of Pd nanocubes was about 3.1 nm.

In another experiment, the molar ratio of TOP/Pd-OLA was kept as 10:1, but the reaction time was prolonged to 60 min. The reaction produced Pd nanocubes having an average edge length of about 5.8 nm. The experimental results are shown in FIG. 2.

TOP was chosen to act as the ligand in the present method. The molar ratios of TOP to Pd-OLA complex were surprisingly critical to synthesize Pd nanocubes. In another experiment, the molar ratio of TOP to Pd-OLA complex was adjusted to 15:1. The reaction temperature and reaction time were maintained at 250° C. and 20 minutes, respectively. The resulting average edge length of Pd nanocubes increased to about 5.7 nm. The experimental results are shown in FIG. 3A. Under the same reaction temperature and reaction time, the molar ratios of TOP to Pd-OLA complex were decreased to 5:1 and 2:1. The 5:1 molar ratio produced Pd nanocubes having an average edge length of about 4.3 nm (FIG. 3B) and 3:1 molar ratio produced irregular shape Pd nanoparticles with an average size of about 1.9 nm (FIG. 3C), respectively. In the absence of TOP ligand, the reaction method produced aggregated Pd nanoparticles (FIG. 3D). The experimental results surprisingly showed that the average edge length of Pd nanocubes increased with the amounts of TOP used in the present method and indicated that the TOP molecule not only acted as a shape-control ligand, but also functioned as a reducing agent to increase the nucleation and growth rate of Pd nanocrystals.

EXAMPLE 4

X-Ray Diffraction, Gas Chromatography, and HPLC Characterizations of the Products Obtained in Example 2

A Bruker D8 Advance X-ray diffractometer with Cu Kα radiation operated at a tube voltage of 40 kV and a current of 40 mA was used to obtain X-ray diffraction (XRD) patterns. Transmission electron microscopy (TEM) images were captured using an FEI Tecnai 20 microscope with an accelerating voltage of 200 kV. Gas products ($H_2$ and CO) were detected by gas chromatography instruments (Shimadzu corporation). The separated gas products were analyzed by a thermal conductivity detector (for $H_2$) and a flame ionization detector (for CO). Liquid products were analyzed by a high performance liquid chromatography (HPLC, Dionex UltiMate 3000 UHPLC+, Thermo Scientific).

EXAMPLE 5

Pd Nanocubes Catalyzed $CO_2$ Reduction Reaction

Electrochemical $CO_2$ reduction experiments were conducted using a potentiostat (VersaSTAT MC) in a two compartment electrochemical cell separated by an anion-exchange membrane (Selemion AMV). A platinum plate counter electrode and a leak-free Ag/AgCl reference electrode (Innovative Instruments, diameter: 2.0 mm) were used in a three electrode configuration. A working electrode was prepared by drop-casting 500 μg of Pd nanocubes, which were dispersed in hexanes, onto a carbon glassy electrode (Catalysts film area: 0.785 $cm^2$). The working electrode was dried under argon at room temperature. 2.0 mL of electrolyte were added to the working electrode compartment and the counter electrode compartment, respectively. The working electrode compartment was sealed in order to allow measurements of gas products. All potentials in this example were converted to the RHE scale by E(vs RHE)=E(vs Ag/AgCl)+0.205 V+0.0591×pH. The 0.1 M $KHCO_3$ electrolyte was prepared from $K_2CO_3$ saturated with $CO_2$ (pH 7.5).

During the reduction experiment, $CO_2$ flowed through the working electrode compartment at a rate of 5 standard cubic centimeters per minute (SCCM). During chronoamperometry, effluent gas from the cell was directed to the sampling loop of a gas chromatography system to analyze the concentration of gas products. Quantification of the gas products was performed with the conversion factor derived from the standard calibration gases. Liquid products were analyzed afterwards by HPLC. The concentrations were calculated using calibration curves, which were developed for each individual component. Faradaic efficiencies were calculated from the amount of charge passed to produce each product, divided by the total charge passed at a specific time or during the overall run.

To evaluate the catalytic performance of Pd nanocubes, Pd nanocubes having an average edge length of about 3.1 nm were used as the $CO_2$ reduction catalysts. The 3.1 nm Pd nanocubes were loaded onto a glassy carbon electrode to serve as a working electrode. FIG. 5 shows both CO and $H_2$ faradic efficiency (FEs) under a variety of applied potentials vs. RHE. At very negative potentials (−0.9 V vs. RHE), $H_2$ and CO were the dominant products. Pd nanocube catalysts showed excellent selectivity for CO, which can reach the maximum FE of 56% at −1.0 V vs. RHE, a performance comparable to commercially available Pd catalysts as reported in the literature. When the potentials reached −1.3 V, $H_2$ became the dominant products for $CO_2$ reduction reaction. These catalytic results indicated Pd nanocubes played a very important role to tune the selectivity for the final products of $CO_2$ reduction reaction.

EXAMPLE 6

Powder X-Ray Diffraction Characterization of Pd Nanocubes

FIG. 4 showed X-ray diffraction (XRD) patterns of Pd nanostructures having three different average edge lengths. Pd nanocubes had the strongest {111} diffraction peak, which was consistent with face centered cubic (fcc) bulk Pd (Joint Committee on Powder Diffraction Standards, JPCDS 05-0681, XRD peaks are annotated in { }). The reduced size of Pd nanoparticles led to broadened diffraction peak. With the size of Pd nanoparticles increasing, the half width of {111} diffraction peak turned narrower, indicating that the crystallinity of Pd nanoparticles was enhanced with the increased size. Small cubelike Pd nanocrystals were formed in the present method. Although no {200} peaks had been observed, the XRD patterns confirmed the formation of pure Pd crystals.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Herein, the recitation of numerical ranges by endpoints (e.g. between about 50:1 and 1:1, between about 100 and 500° C., between about 1 minute and 60 minutes) include all numbers subsumed within that range, for example, between about 1 minute and 60 minutes includes 21, 22, 23, and 24 minutes as endpoints within the specified range. Thus, for example, ranges 22-36, 25-32, 23-29, etc. are also ranges with endpoints subsumed within the range 1-60 depending on the starting materials used, temperature, specific applications, specific embodiments, or limitations of the claims if needed. The Examples and methods disclosed herein demonstrate the recited ranges subsume every point within the ranges because different synthetic products result from changing one or more reaction parameters. Further, the methods and Examples disclosed herein describe various aspects of the disclosed ranges and the effects if the ranges are changed individually or in combination with other recited ranges.

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

As used herein, the term "about" and "approximately" are defined to being close to as understood by one of ordinary skill in the art. In one non-limiting embodiment, the term "about" and "approximately" are defined to be within 10%, preferably within 5%, more preferably within 1%, and most preferably within 0.5%.

The examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, dimensions, etc.) but some experimental errors and deviations should be accounted for.

Moreover, all references throughout this application, for example patent documents including issued or granted patents or equivalents; patent application publications; and non-patent literature documents or other source material; are hereby incorporated by reference herein in their entireties, as though individually incorporated by reference.

What is claimed is:

1. A method for preparing metal nanocubes, the method comprising:
    providing a metal complex solution comprising a first complexing agent and a first palladium source selected from palladium acetylacetonate, palladium acetate, palladium trifluoroacetate, palladium nitrate, and palladium hexafluoroacetylacetonate;
    heating a reaction mixture comprising a shape control ligand under inert atmosphere to a combining temperature;
    combining the metal complex solution and the reaction mixture at the combining temperature under inert atmosphere;
    holding the reaction mixture at the combining temperature for a combining time under inert atmosphere;
    heating the reaction mixture to a reaction temperature under inert atmosphere; and
    holding the reaction mixture for a reaction time at the reaction temperature under inert atmosphere to form metal nanocubes.

2. The method of claim 1, further comprising:
    cooling the reaction mixture containing the metal nanocubes; and
    isolating the metal nanocubes from the reaction mixture.

3. The method of claim 2, further comprising washing the nanocubes with an organic solvent.

4. The method of claim 1, wherein the metal complex solution further comprises platinum, gold, silver, or a combination thereof.

5. The method of claim 1, wherein the metal complex solution is provided by mixing the first palladium source with the first complexing agent to form the metal complex solution, wherein the first complexing agent comprises an alkylamine selected from oleylamine, tetradecylamine, hexadecylamine, octadecylamine, and combinations thereof.

6. The method of claim 1, wherein the shape control ligand comprises one or more trialkylphosphines.

7. The method of claim 6, wherein the shape control ligand is chosen from trioctylphosphine, tributylphosphine, and combinations thereof.

8. The method of claim 1, wherein the combining temperature is 185° C. to 220° C. and the reaction temperature is 240° C. to 260° C.

9. The method of claim 8, wherein the combining time is 15 to 25 minutes.

10. The method of claim 8, wherein the reaction time is 15 to 25 minutes.

11. The method of claim 1, wherein the metal complex solution is provided by mixing the first palladium source with the first complexing agent until a solution comprising palladium is formed, wherein the first palladium source comprises palladium acetylacetonate and the first complexing agent comprises oleylamine.

12. The method of claim 11, wherein shape control ligand is trioctylphosphine and further comprising wherein the molar ratio of trioctylphosphine to palladium in the reaction mixture is from 15:1 to 2:1.

13. The method of claim 12, wherein the combining temperature is 200° C., the combining time is 20 minutes, the reaction temperature is 250° C., the reaction time is 20 minutes, the molar ratio of trioctylphosphine to palladium in the reaction mixture is 10:1, and the metal nanocubes comprise palladium nanocubes comprising an average size of 3.1 nm.

14. The method of claim 12, wherein the combining temperature is 200° C., the combining time is 20 minutes, the reaction temperature is 250° C., the reaction time is 60 minutes, the molar ratio of trioctylphosphine to palladium in the reaction mixture is 10:1, and the metal nanocubes comprise palladium nanocubes comprising an average size of 5.8 nm.

15. The method of claim 12, wherein the combining temperature is 200° C., the combining time is 20 minutes, the reaction temperature is 250° C., the reaction time is 20 minutes, the molar ratio of trioctylphosphine to palladium in the reaction mixture is 15:1, and the metal nanocubes comprise palladium nanocubes comprising an average size of 5.7 nm.

16. The method of claim 12, wherein the combining temperature is 200° C., the combining time is 20 minutes, the reaction temperature is 250° C., the reaction time is 20 minutes, the molar ratio of trioctylphosphine to palladium in the reaction mixture is 5:1, and the metal nanocubes comprise palladium nanocubes comprising an average size of 4.3 nm.

17. The method according to claim 1, wherein the reaction temperature is 240° C. to 260° C. and wherein the metal nanocubes have an average size from 1.9 nm to 5.8 nm.

* * * * *